United States Patent [19]

Bean

[11] 3,750,942
[45] Aug. 7, 1973

[54] DISTANCE MODE AREA NAVIGATION COMPUTER

[75] Inventor: Stephen F. Bean, Columbus, Ohio

[73] Assignee: Autech Corporation, Columbus, Ohio

[22] Filed: Jan. 24, 1972

[21] Appl. No.: 219,992

[52] U.S. Cl........ 235/150.27, 235/150.26, 235/186, 343/112 C
[51] Int. Cl............................................. G06g 7/78
[58] Field of Search................... 235/150.2, 150.23, 235/150.26, 150.27, 186; 343/7.3, 107, 112 R, 112 C, 112 D

[56] References Cited
UNITED STATES PATENTS

| | | | |
|---|---|---|---|
| 3,581,073 | 5/1971 | Visher............................ | 235/150.26 |
| 3,320,612 | 5/1967 | Crow et al. ......................... | 343/7.3 |
| 3,534,399 | 10/1970 | Hirsch............................ | 235/150.27 |
| 3,652,837 | 3/1972 | Perkins........................ | 235/150.27 |
| 3,621,212 | 11/1971 | Hobbs et al.................... | 235/150.27 |
| 3,691,361 | 9/1972 | Perkins.......................... | 235/150.27 |
| 3,643,074 | 2/1972 | Hobbs............................ | 235/150.27 |

Primary Examiner—Charles E. Atkinson
Assistant Examiner—Jerry Smith
Attorney—Robert E. LeBlanc et al.

[57] ABSTRACT

An area navigation computer is disclosed which is designed to be compatible with all standard VOR and DME receivers. To avoid dependence on the characteristics of the latter, the DME information is generated by direct processing of the transponder interrogation and response data. Multiple waypoint address selection capability is provided by digital generation of waypoint bearing and range data, and digital processing of the VORTAC to aircraft and VORTAC to waypoint vector data. Selected track angle information is also generated digitally to maximize operational accuracy at lowest possible cost.

17 Claims, 8 Drawing Figures

DISTANCE MODE AREA NAVIGATION COMPUTER

INTRODUCTION AND BACKGROUND

The present invention relates to area navigation, and more particularly to area navigation computers having important advantages over existing equipment.

The concept of area navigation is an outgrowth of the availability of a widespread network of air navigation aids called VORTAC's. These combine the capabilities of standard VHF omnidirectional range equipment with the TACAN tactical air navigation system to provide radio signals which are utilized on-board an aircraft to provide azimuth (i.e., bearing) and range information for the aircraft with respect to the VORTAC facility. Thus, an aircraft suitably equipped with VOR and DME (distance measuring equipment) receivers can locate its bearing and range relative to a VORTAC station. By reference to a chart showing the VORTAC location, the absolute position of the aircraft may readily be ascertained. The resulting information is customarily utilized to maintain a course between a succession of VORTAC facilities along the desired course. Suitable on-board indicators show range data and left-right deviation with espect to a selected course to or from the VORTAC.

To alleviate inevitable overcrowding of established airways between VORTAC's, area navigation may be used to plot a course cross-country, i.e., off the established airways. Such a course can be along tracks parallel to established airways between VORTAC's or simply between a series of arbitrary points, usually referred to as "waypoints," within the range of a succession of VORTAC facilities near the desired course.

In practice, the series of waypoints are defined by the range and bearing to a nearby VORTAC. An on-board area navigation computer solves the vector triangle defined by the VORTAC to aircraft and VORTAC to waypoint vectors to generate a third vector representing the range and azimuth from the waypoint to the aircraft. This is fully equivalent to the VORTAC to aircraft vector in terms of locating the aircraft, and navigation with respect to the waypoints proceeds as it would with direct reference to the VORTAC itself. Because the waypoint may be located arbitrarily (within range of the reference VORTAC) the pilot is no longer constrained to flight along or near the established airways but instead may fly along any convenient course to his particular destination.

From the above, it may be appreciated that an area navigation system must include a suitable VOR or "NAV" receiver, and a DME receiver, to generate the azimuth and range components for the VORTAC to aircraft vector, and the area navigation computer including means to generate the VORTAC to waypoint vector, and equipment to solve the vector triangle to generate the waypoint to aircraft vector. In addition, suitable display equipment must be provided to make the area navigation data conveniently usable by the pilot.

Complete area navigation system including all of the foregoing equipment are available from several sources. One such system has become the standard for use in commercial aviation, and is a highly effective and useful piece of equipment. However, such equipment is quite expensive, and is consequently beyond the means of most general aviation pilots.

Less expensive area navigation systems are available from other sources but these suffer from several disadvantages. For example, considering all the required components, the systems are still quite costly, whereby pilots typically purchase the required equipment in stages, beginning with the VOR receiver, and then the DME receiver, which are usable for standard VOR and VOR/DME navigation. Thus, while the area navigation computers are obtainable separately, computers available from one source are seldom compatible with other system components provided by other suppliers. This may significantly limit a potential purchaser in the choice of new equipment. This is a significant consideration since it is estimated that well over a 100,000 operational aircraft are already equipped with VOR and DME receivers, few of which already have area navigation capability. An important feature of the area navigation computer of the present invention is its compatibility with all known VOR and DME equipment.

Incompatibility with currently existing DME equipment is a particularly serious concern since DME receivers are often the most costly component of the system. Notwithstanding, even for those DME receivers for which currently available area navigation computers are compatible, reliance on the distance measuring circuitry contained in the DME results in an unpredictable level of accuracy in generating the VORTAC to aircraft range data. Another feature of the present invention, therefore, is to provide an area navigation computer which avoids the need to rely on the distance measuring circuitry in the DME receiver.

To accomplish the foregoing, the area navigation computer of the present invention utilizes only the interrogation signal actually transmitted to the VORTAC, and a signal representing the range data returned in response to the interrogation signal. In effect, by utilizing only the RF "front-end" of the DME receiver, and processing the outgoing and incoming pulse data outside of the DME, improved performance results in most instances, and in any event, makes it possible to utilize an existing DME receiver without the need for costly modification.

Yet another disadvantage of heretofore available equipment is the inability to establish in advance the range and bearing data for a succession of waypoints. In such equipment, the bearing component of the VORTAC to waypoint vector is generated by a potentiometer, or a synchro-resolver in form of a voltage or phase angle. The range component is ordinarily provided by a potentiometer. Once the aircraft passes beyond the selected waypoint, the potentiometer and synchro must be readjusted to the desired range and bearing angle for the next waypoint. Such arrangement is acceptable, but there results a period of time after passage over a first waypoint during which no guidance data is available until the range and bearing components for the new waypoint have been set. Since this operation may take several seconds to accomplish accurately, a significant period of time may exist during which the aircraft is without guidance information.

The seemingly appropriate solution to this problem is to provide duplicate bearing and range setting equipment so that a second waypoint "address" may be preset and switched on. However, this is not done, mainly because of the difficulty in maintaining constant phase tracking between the two or more synchros which would be necessary to provide accurate bearing data for multiple waypoints.

In the present invention, accurate multiple waypoint address capability is achieved by use of novel bearing angle generation techniques employing digital phase angle synthesizers. Not only is the result less expensive and more accurate as to the address of each waypoint individually, but also assures sufficient tracking accuracy between synthesizers to permit preselection of the bearing angles for a succession of waypoints.

Another feature of the present invention is the utilization of the aforementioned digital phase angle synthesizers to establish the bearing of a selected track of the aircraft with respect to the waypoint. In conventional VOR equipment, course selection (i.e., selection of the course bearing with respect to the VOR) is ordinarily accomplished by means of a synchro or a potentiometer. The analogous function of selecting a track angle with respect to the waypoint is accomplished in precisely the same manner in heretofore available area navigation systems. Substantial improvement in accuracy is achieved in the present invention by employing the same digital technique for track angle generation as for generation of the bearing component of the waypoint address since tracking error between the waypoint bearing and track selector synchros is essentially eliminated.

A further feature of this invention leading to extremely high accuracy at reasonable cost is the utilization of a particular form of digital processing of the VOR and DME data to generate the VORTAC to aircraft vector. Briefly, the bearing component of this vector is generated digitally with respect to the same reference clock as is used for the waypoint address bearing component and the selected track angle. As a result, whatever error exists in the reference clock affects all of the data processing functions equally and in fact cancels itself out, thereby improving accuracy without recourse to complicated and expensive circuitry. Also, the digital processing facilitates use of digital filtering techniques if necessary to improve the quality of the incoming VOR signal.

Accordingly, among the objects of the present invention are the following:

to provide an improved area navigation computer;

to provide an area navigation computer which is relatively low in cost, and extremely accurate in operation;

to provide an area navigation computer which is compatible with all existing VOR and DME receivers;

to improve the accuracy of the range component of the incoming data without a costly DME receiver;

to improve the quality of the DME signal used by the area navigation computer by bypassing the range computing circuitry in the receiver and utilizing only the raw incoming RF data in conjunction with the receiver-generated interrogation pulses;

to provide an area navigation computer having the capability for advance establishment of a plurality of waypoint addresses;

to dispense with the use of synchros in the generation of the bearing component of the waypoint address and to substitute instead digital phase angle synthesizers;

to dispense with the use of synchros and to substitute digital phase angle synthesizers for the bearing of a desired track with respect to the waypoint;

to provide an area navigation computer in which the bearing and range components of the VORTAC to aircraft vector are processed digitally to generate the VORTAC to aircraft vector with the digital processing under control of the same reference clock as is used to generate bearing components of the waypoint address.

DESCRIPTION OF THE DRAWINGS

The exact nature of this invention, together with other objects and advantages thereof will be apparent from consideration of the following detailed description taken in conjunction with the drawing, in which.

Figure 1:
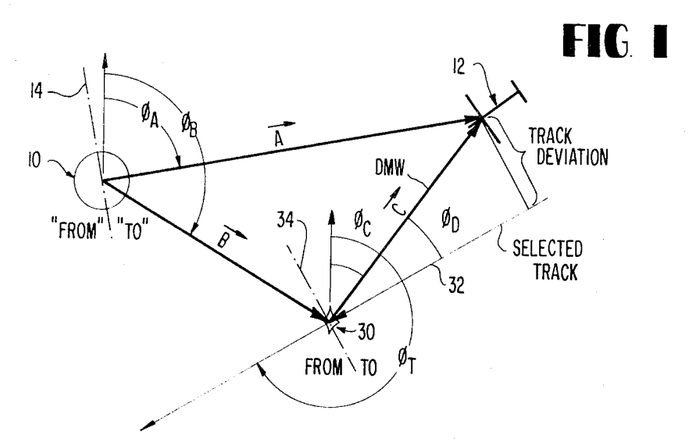
FIG. 1 is a vector diagram useful in the understanding of the underlying concepts of area navigation.

With reference now to FIG. 1, there is illustrated a VORTAC facility 10, and an aircraft 12. Position of the aircraft with respect to the VORTAC is ordinarily defined in terms of a vector $\bar{A}$ having a magnitude $|A|$ and an azimuth (with respect to north) of $\phi_A$. [Conventionally, vectors eminating from a VORTAC are termed "radials," and the A vector in FIG. 1 coincides with the $\phi_A$ radial of VORTAC 10. The inverse of the angle $\phi_A$, $\phi_A + 180$ is the aircraft bearing to the VORTAC.]

In conventional VOR navigation, the magnitude $|A|$ 09 and the angle $\phi_A$ are computed, and utilized to locate the aircraft relative to the VORTAC, and relative to a selected course, i.e., a desired bearing of approach toward the VORTAC. A "left-right" course deviation indicator provides a measure of how many degrees to the left or right the aircraft bearing must be changed to intercept the desired course. A "to-from" indicator is normally provided as part of the course deviation indicator. The "to" indication is given if the course deviation angle (i.e., desired bearing minus actual bearing) is within plus or minus 90°. The "from" indication is given if the course deviation angle is more than 90° or less than −90°. The dashed line 14 in FIG. 1 represents the "to-from" boundary, assuming vector $\bar{A}$ in fact to be the selected course.

For area navigation, one establishes a succession of arbitrary landmarks such as that denoted 30, and commonly called waypoints. Waypoint 30 has a known bearing $\phi_B$ and a range $|B|$ with respect to a VORTAC such as 10 in its vicinity, thereby defining the vector $\bar{B}$ from the VORTAC to the waypoint. The triangle defined by vectors $\bar{A}$ and $\bar{B}$ includes a third side $\bar{C}$ defining an azimuth angle $\phi_C$ and a range $|C|$ of the aircraft with respect to the waypoint. Since the components of the vector $\overline{A}$ are determined from the incoming VOR and DME data respectively, and since the components of the vector $\overline{B}$ may be determined for a selected waypoint from a suitable navigation chart, the $\overline{C}$ vector can be determined by the vector subtraction $\overline{A} - \overline{B}$. Once this is done, the navigator using an area navigation system may treat the vector $\overline{C}$ in precisely the same manner as a navigator using standard VOR/DME techniques would treat the vector $\overline{A}$.

In particular, a selected track 32, analogous to the "selected course" mentioned above, may be defined as the desired bearing of the aircraft as it approaches the waypoint, and a track deviation angle $\phi_D$ computed as the difference between the actual bearing of the aircraft from the waypoint $(180 + \phi_C)$ and its desired bearing $\phi_T$ along the selected track, i.e., $\phi_D = 180 + \phi_T - \phi_C$. Then, having measured (actually, computed) the range $|C|$, track deviation in nautical miles is computed according to the relationship T.D. = $|C| \sin \phi_D$. This quantity, representing perpendicular distance between the aircraft and its selected track, is displayed on a track deviation indicator which is ordinarily a "left-right" indicator identical to the standard course deviation indicator. Again, as in the case of conventional VOR navigation, a "to-from" indicator is used to show whether the aircraft is more or less than 90° off the selected track. (See line 34 in FIG. 1.)

The aircraft may now be flown from waypoint to waypoint without need to follow crowded airways between VORTAC's, thereby improving flight safety, and often reducing flight time by allowing selection of a direct route to a destination.

Figure 2:
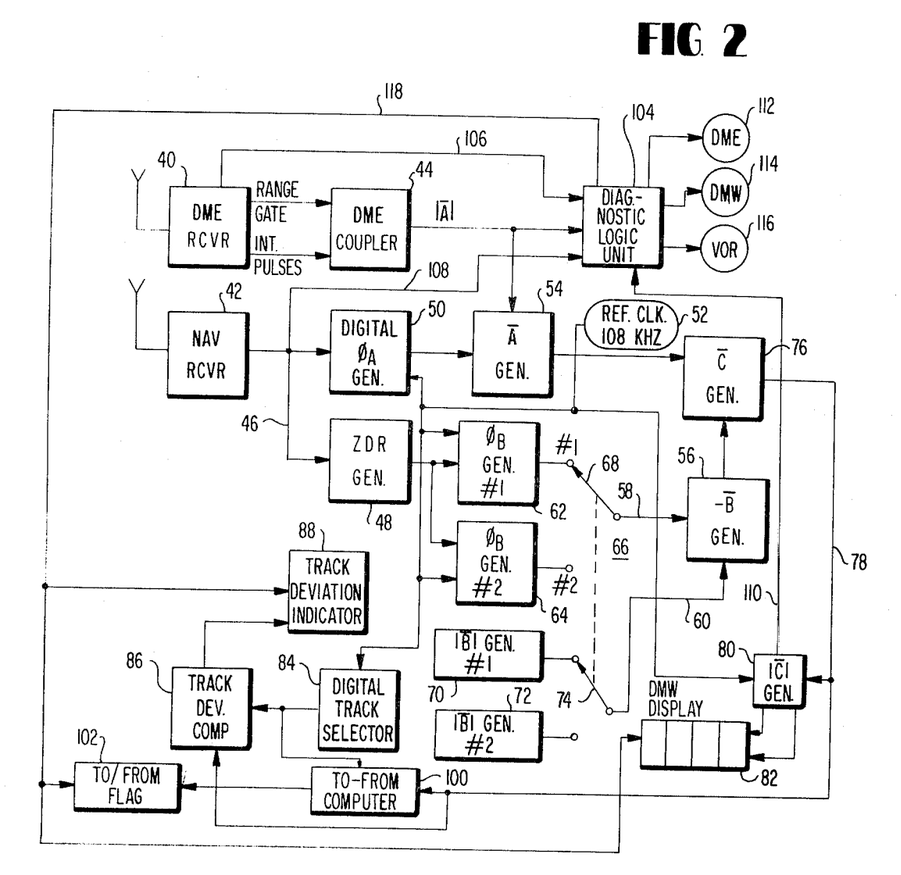
FIG. 2 is a generalized block diagram showing the organization and important features of the present invention.

The apparatus of the present invention utilizes the above-described concepts of area navigation in a highly advantageous manner. The essential features of one preferred embodiment are illustrated in FIG. 2.

Data from which the vector $\overline{A}$ is generated is received from a nearby VORTAC by a DME receiver 40 and a VOR or "NAV" receiver 42. In accordance with an important feature of this invention, receivers 40 and 42 are conventional units available from a variety of sources, and are often already present in the aircraft for use in normal VOR/DME navigation before the owner decides to add the area navigation capability. Such compatibility can significantly reduce the cost of an installation, particularly since replacement of a costly DME receiver is not necessary and also allows a wide range of equipment selection for a user fitting out an aircraft with a complete installation.

In accordance with a further feature of this invention, the DME receiver is preferably utilized only to generate the interrogation pulses for transmission to the VORTAC, and to receive the VORTAC return pulses. The actual range information, i.e., the magnitude $|A|$ 09 of the VORTAC to aircraft vector $\overline{A}$ (see FIG. 1) is generated by use of a novel DME coupler unit 44. The raw information from DME receiver 40 may be obtained in several ways, but according to a preferred embodiment, the transmitted interrogation pulses, and the range gate (generated internally to scan for the return pulses) are simply coupled out of the DME receiver and provided to DME coupler 44. This, in turn, selects the first of the two interrogation pulses, i.e., the "suppression pulse," to initiate a timing interval which extends to the beginning of the range gate. This interval, after appropriate compensation for system time delays, represents the quantity $|A|$. The foregoing arrangement is particularly advantageous since the signals utilized are essentially constant in shape and amplitude, and avoids the need to rely on already processed or partially processed data in obtaining the DME information.

The NAV receiver 42 is used in conventional fashion to generate the summation of a 30 Hz frequency modulated 9,960 Hz subcarrier signal as the zero degree reference for the transmitting VORTAC, and the 30 Hz variable phase signal resulting from rotation of the VOR antenna. The output of NAV receiver 42 is coupled over lead 46 to a zero degree reference generator unit 48 which demodulates the 9,960 Hz subcarrier and provides a 30 Hz squarewave in phase with the subcarrier modulation.

The NAV receiver output is also provided to a digital phase synthesizer 50 which extracts the 30 Hz variable phase signal, converts it into a squarewave, and thereafter regenerates it digitally under control of a system reference clock 52 operating at an appropriate frequency in light of desired angular resolution. For example, to achieve angle resolution of 0.1°, it is necessary to provide at least 3,600 counting intervals per 360° operating cycle. Since the variable phase signal generated by the VOR is at 30 Hz, it will be appreciated that each 360 degree operating cycle is exactly 1/30 second in duration. Thus, for 3,600 pulses per cycle, 30 × 3,600 = 108,000 counting intervals must be generated per second, whereby the operating frequency of reference clock 53 is 108 kHz.

The output of phase synthesizer 50 representing angle $\phi_A$, (see FIG. 1) and the output of DME coupler 44, representing $|A|$ are coupled to a vector generator 54 which combines the two components to generate an electrical analog of the vector $\overline{A}$. The vector $\overline{B}$ which constitutes the second side of the vector triangle shown in FIG. 1, is generated by a second vector generator unit 56. This, in turn receives inputs representing the angle $\phi_B$, and the waypoint to VORTAC range $|B|$, respectively, over leads 58 and 60.

The $\phi_B$ angle signal is generated by one of two digital phase synthesizers 62 and 64 under the control of reference clock 52 and the zero degree VORTAC reference provided by ZDR generator 48. Suitable manual switches (not shown) are used to establish the desired value of the angle to a resolution of 0.1°. A switch 66 having a movable arm 68 manually selects between phase generators 62 and 64 to provide the desired angle signal. Provision of two digital phase synthesizers 62 and 64 allows presetting of the azimuth components for two waypoint addresses, eliminating the interval after interception of a waypoint during which no guidance information is available if only one waypoint address setter is available.

The range components of the two waypoint addresses are provided by a pair of generator circuits 70 and 72, the outputs of which are connected through a second arm 74 of switch 66 to lead 60. Circuits 70 and 72 are preferably switch controlled resistors providing decade potentiometers of the desired resolution, for example 0.1 nautical mile.

Circuit 56 includes means for inverting the $\overline{B}$ vector analog to produce a vector $-\overline{B}$. The $\overline{A}$ vector analog and the $-\overline{B}$ vector analog are provided to a $\overline{C}$ vector generator 76 which combines the two inputs to produce the $\overline{C}$ vector analog on lead 78. This is coupled to a vector magnitude generator unit 80. This, in conjunction with a digital display unit 82 provides a continuously updated indication of the instantaneous distance DMW from the aircraft to the waypoint (see FIG. 1). The C vector analog signal is also used, as explained below, to generate a track deviation signal.

As in the case of the azimuth component of the waypoint address, the selected track angle $\phi_T$ is preferably generated digitally. To this end, there is provided a digital track selector unit 84 operating under control of reference clock 52, and including a series of manual switches (not shown) to generate a digital representation of the selected track angle to a resolution of 0.1°. The selected track angle analog signal is provided to a track deviation computer 86 which operates to generate a signal $|C| \sin \phi_D$ (see FIG. 1), i.e., the track deviation analog. This signal may be displayed in several ways but in view of the user's familiarity with the standard "left-right" course deviation indicator for VOR guidance, a like track deviation indicator 88 is preferred. Alternatively, the course deviation indicator already present in a standard VOR installation may be used with suitable switching, as an economy measure, or to save space, if desired. A separate digital display is also satisfactory, but because the user is accustomed to reading course deviation in degrees on his course deviation indicator, and track deviation is a linear quantity, where space and cost factors permit, an entirely separate, i.e., dedicated display unit 88 is preferred.

In addition, a "to-from" indication for the aircraft with respect to line 34 in FIG. 1 is provided. This is accomplished by a "to-from" computer 100 which compares the selected track angle $\phi_T$ with the actual bearing angle $180 + \phi_C$ to operate a conventional indicator 102, which may be part of track deviation indicator unit 88, or a separate unit, if desired. In either case, if the output of "to-from" computer 100 indicates that the deviation angle $\phi_D$ exceeds plus or minus 90°, a "from" indication will be given while for deviation angles less than 90° a "to" indication is given.

The remaining circuitry illustrated in FIG. 2 warns the user in the event that incoming or generated information is invalid, lost, etc., for some reason, thereby cautioning the user not to rely on such information for guidance purposes. To this end, there is provided a diagnostic logic unit 104, which receives as inputs, the "DME lock loss" signal from DME receiver 40 over lead 106, the $|A|$ signal from DME coupler 44, the output of NAV receiver 42 over lead 108, and a signal over lead 110 from $\overline{C}$ vector magnitude generator unit 80. Logic unit 104 processes all these inputs to provide various warning indications by means of DME error light 112, DMW error light 114, and VOR error light 116.

Also, whenever the diagnostic circuit operates, an additional control signal is provided over lead 118 to blank DMW display unit 82, as well as track deviation indicator 88 and "to-from" indicator 102, if desired. The latter functions to return the track deviation indicator to a zero position, and give an "off" indication for the "to-from" unit. The user is thus prevented from utilizing erroneous data and is concurrently provided with an indication of which input data source is causing the difficulty.

Diagnostic logic unit 104 may be constructed in any suitable manner. For example, there may be comparators associated with the $\overline{A}$ magnitude and $\overline{C}$ magnitude inputs to provide internal signals indicating when these inputs exceed preset limits. These signals may be combined by means of suitable logic circuitry to drive the various indicators 112 through 115, and provide the required blanking signal.

Figure 3:
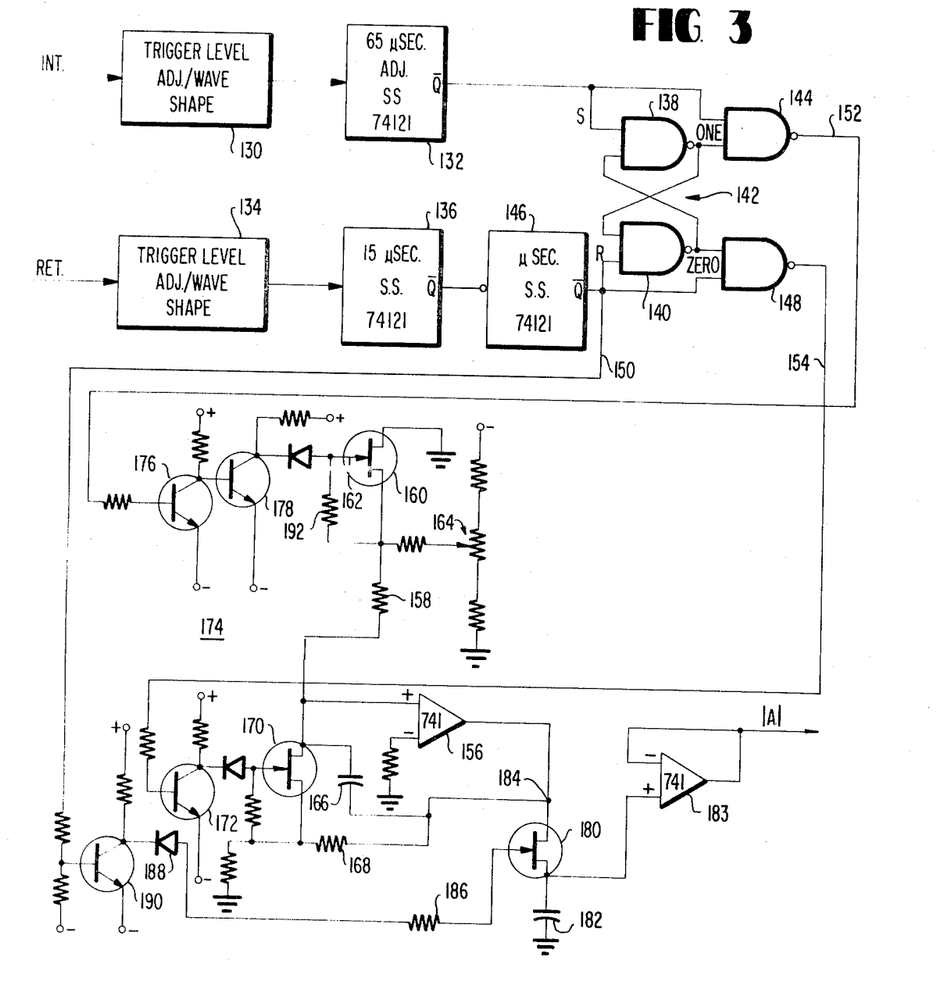
FIG. 3 is a detailed diagram showing the construction of the DME data processing subsystem.

FIG. 3 shows the construction of DME coupler unit 44. Basically, this comprises timing circuitry to establish a range measuring interval between an interrogation pulse transmitted by the DME unit and the response returned by the DME transponder, a linear integrator to generate a ramp as the measure of the duration of the measuring interval, and a sample and hold circuit to store a level of the integrator output at the end of the measuring interval.

The circuit includes a triggering level adjusting and wave shaping circuit 130 coupled to the interrogation output of the DME receiver. This includes amplification circuitry, biasing means to set a minimum triggering level for the input, and pulse squaring circuit to assure sharply defined, noise-free pulses. The output of circuit 130 is coupled to the input of a 65 microsecond adjustable single shot multi-vibrator 132. A second triggering level adjustment and waveshaping circuit 134 is coupled to the return output of DME receiver 44. The output of circuit 134 is coupled to the input of a 15 microsecond single shot multivibrator 136. Single shots 132 and 136 are advantageously of the nonretrigerable type, such as Texas Instruments Type SN-74121, and do not respond to additional pulses during the triggering interval. Single shot 136 is thus activated by the leading edge of the range gate, or by the first of the demodulated return pulses gated by the range gate if the latter, rather than the range gate itself is employed. The 15 microsecond active period is selected to exceed the typical 12 microsecond interval between the DME return pulses whereby single shot 136 triggers only once for each pulse pair. Single shot 132 operates similarly, thus responding only to the first of the interrogation pulses, i.e., the so-called "suppression pulse." The total 65 microseconds delay includes the standard 50 microsecond delay between reception of an interrogation pulse pair and generation of the transponder return pulses. The remaining 15 microseconds delay capability permits compensation for various delays in the RF "front end" of the DME receiver, thereby assuring extremely accurate definition of the range measuring interval.

The $\overline{Q}$ output of single shot 132 is connected to one input of a pair of cross-coupled NAND gates 138 and 140 which cooperate to form a set-reset flip-flop 142, and also, as one input to a further NAND gate 144. The indicated input for flip-flop 142 is the "set" input; the corresponding output of NAND gate 138 (the ONE output) provides the second input to NAND gate 144. The "reset" input for flip-flop 142 is provided by 15 microsecond single shot 136 coupled through a further single shot 146 having a fixed delay period of about 1 microsecond or less. Single shot 146 is arranged to be triggered in response to a high to low transition of the $\overline{Q}$ output of single shot 136, whereby both single shots 136 and 146 are triggered by the leading edge of the range gate or by the first return pulse from the DME transponder. The $\overline{Q}$ output of single shot 146 is connected to NAND gate 140 in flip-flop 142, and also as one input to a further NAND gate 148, the latter, analogously to NAND gate 144, receiving its second input from the ZERO output of flip-flop 142. The $\overline{Q}$ output of single shot 146 is also connected over lead 150 to actuate the sample and hold circuit, as described below.

Recalling that low values of the set and reset inputs of flip-flop 142 respectively produce high values for the ONE and ZERO outputs, circuit operation may be described as follows:

With single shots 132, 136, and 146 at rest, the respective $\overline{Q}$ outputs will be high. At the beginning of a DME interrogation cycle, the first one of the interrogation pulses triggers single shot 132 producing a low value for the set input of flip-flop 142. This makes the ONE output high and the ZERO input low which conditions NAND gate 144 but does not permit it to operate since the other input, provided by single shot 132 is still low at this time. When single shot 132 times out, its output returns high, and NAND gate 144 is actuated to provide a low output on lead 152. The output of NAND gate 148 on lead 154 is still high at this time since flip-flop 142 is still set and its ZERO output is still low.

At the beginning of the range gate, or in response to the first transponder return pulse, single shots 136 and 146 are triggered, producing a low output from single shot 146. This resets flip-flop 142, causing NAND gate 144 to turn off whereby the signal on lead 152 returns to a high level. The range measuring interval is therefore defined by the period between the first of the interrogation pulses, and the beginning of the range gate or the first of the return pulses, as indicated by the low level of the signal on lead 152.

As will be appreciated, triggering of single shot 146 produces a low value of its $\overline{Q}$ output. This resets flip-flop 142, which in turn conditions NAND gate 148. Then, when single shot 146 times out about 1 microsecond later, NAND gate 148 operates, and a low level appears on lead 154. This signal remains low until single shot 142 is again set at the beginning of the next interrogation period.

The remainder of FIG. 3 illustrates the integration and sample and hold circuits for utilizing the pulses appearing on leads 150 through 154. The integrator itself comprises an operational amplifier 156 having a resistive input circuit and a capacitive feedback circuit. The input circuit comprises a resistor 158 and a field effect transistor 160 arranged to shunt input resistor 158 to ground when the transistor conducts. An adjustable negative DC voltage input is provided to resistor 158 by means of a voltage divider circuit 164.

The feedback path for amplifier 156 is provided by a capacitor 166. A discharge circuit for capacitor 166 is provided by a resistor 168 and a second field effect transistor 170 connected in series across the capacitor. The gate input for FET transistor 170 is provided by another transistor 172 having its input coupled over lead 154 to the output of NAND gate 148. The gate input for FET 160 is provided by another transistor circuit 174 comprising a pair of transistors 176 connected in cascade and driven by the output of NAND gate 144 over lead 152.

The sample and hold circuit comprises a further FET 180 and a capacitor 182 in series with the drain to source current path. The source terminal 184 of FET 180 is connected directly to the output of integrator amplifier 156, and consequently to integrating capacitor 166. The gate terminal of transistor 180 is connected by means of a gate resistor 186, and a diode 188 (to prevent gate current flow) to the output of a control transistor 190, the base of which is resistively coupled over lead 150 to the output of single shot 146. The A 9 signal, as represented by the charge on capacitor 182 is coupled through an amplifier 183, connected as a voltage follower to minimize capacitor loading.

As will be recalled, except during the range measurement interval, the signals on leads 150 and 152 are high, and the signal on lead 154 is low. The high level on lead 150 maintains transistor 190 conductive, which provides a sufficiently low gate voltage to maintain FET 180 in the "off" condition. This isolates sample and hold capacitor 182 and retains on it whatever charge was applied when FET 180 last conducted.

The high signal level on lead 152 maintains transistor 176 on and transistor 178 off whereby a sufficiently high gate voltage is provided to cause FET 160 to conduct. This grounds input resistor 158, so the input for integrating amplifier 156 is held at ZERO and no charge accumulates on capacitor 166. The low level on lead 154 maintains transistor 172 cut off. This provides positive gate voltage to operate FET 170, completing a discharge path for capacitor 166 through resistor 168.

At the beginning of the delay interval established by single shot 132, flip-flop 142 is set, which turns off NAND gate 148, and makes the signal on lead 154 go high. This turns transistor 172 on which turns off FET 170 to open the discharge circuit for capacitor 156. Charge does not accumulate on capacitor 156 at this time, however, because FET 160 still shunts integrator input resistor 158 to ground.

At the end of the operating interval for single shot 132, NAND gate 144 operates, and the signal on lead 152 goes low. This turns off transistor 176 which turns on transistor 178. This, in turn, opens the shunt path through FET 160, and amplifier 156 begins to integrate. Charge accumulates on capacitor 166 at a rate determined by the setting of potentiometer 164, thereby providing the desired relationship (scaling) between integration time and voltage output. Capacitor 166 continues to charge until the transponder return pulse or the range gate triggers single shots 136 and 146, which causes the signal on lead 150 to go low. This turns off transistor 190 which turns on FET 180 to charge capacitor 182 in accordance with the charge level on capacitor 166. After the 1 microsecond active period of single shot 146, its $\overline{Q}$ output returns high causing flip-flop 142 to be reset, which in turn produces a low level on lead 154. As previously described, the high level on lead 150 turns off field effect transistor 180 thereby isolating the newly established charge level on capacitor 182 while the low level on lead 154 activates FET 170 to discharge capacitor 166.

Figure 4:
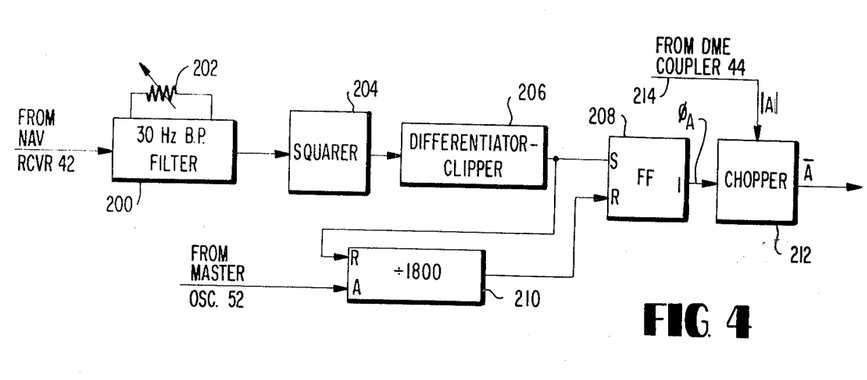
FIG. 4 is a detailed block diagram of the circuitry for generating the VORTAC to aircraft vector A.

FIG. 4 is a block diagram of the digital phase angle generator 50 for angle $\phi_A$ and the $\overline{A}$ vector generator 54 shown in FIG. 2. Angle generator 50 comprises a 30 Hz bandpass filter 200 coupled to the output of NAV receiver 42 which operates to extract the 30 Hz variable phase component of the receiver output. A phase shift adjustment, represented by variable resistor 202, is associated with filter 200 to provide for fine adjustment of the phase of the 30 Hz signal to compensate for phase shifts in a NAV receiver being employed.

The output of filter 200 is connected through a squarer 204 (which may be a saturating amplifier or the like) which converts the 30 Hz signwave into a squarewave. Thissignal is coupled through a differentiator-clipper circuit 206 to the "set" input of a set-reset flip-flop 208. Circuit 206 converts the squarewave into a series of pulses representing the voltage transitions, and selects the positive pulses to set flip-flop 208 in phase with the incoming 30 Hz signal.

The reset input for flip-flop 208 is provided by a divide down counter 210 having a counting base of 1800. The advance input for counter 210 is provided by the output of master oscillator 52 (see FIG. 2) while the reset input is provided by the output of differentiator-clipper 206. Counter 210 is arranged to provide a pulse output every 1800 counts (corresponding to one-half of a 30 Hz period) with oscillator 52 operating at 108 kHz. The counter output is of proper polarity to reset flip-flop 208.

Differentiator-clipper 206 simultaneously sets flip-flop 208 and counter 210, whereby each cycle of the digital $\phi_A$ signal commences simultaneously with the 30 Hz VOR variable phase signal. However, it will be appreciated that flip-flop 208 is reset exactly one half VOR cycle later by the output of counter 210 only if the frequency of oscillator 52 is exactly 108 kHz. On the other hand, if the frequency of oscillator 52 deviates, the two portions of the flip-flop output cycle will not be exactly equal in duration. However, oscillator 52 is also used to generate the phase shift representing angles $\phi_B$ and the selected track angle $\phi_T$, so whatever error is introduced into generation of these angles, is introduced in like amount in generation of the variable phase output of NAV receiver 42, representing the angle $\phi_A$. Thus, any error is balanced out and has no effect on subsequent computations.

The output of flip-flop 208 is used to drive a chopper 212 which may be a transistor switch or the equivalent. The signal gated by chopper 212 is provided over lead 214 by the $|A|$ output of DME coupler 44 described above. Since the $|A|$ signal is gated on and off in synchronism with the squarewave representing the angle $\phi_A$, it may be seen that the chopper output represents the desired analog of the vector $\overline{A}$ — its amplitude representing the range component, and its phase with respect to the zero degree reference representing the azimuth component.

Figure 5:
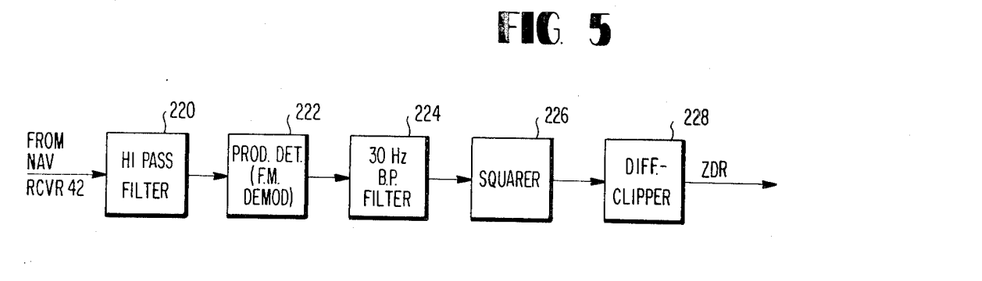
FIG. 5 is a block diagram of the circuitry for generating the zero degree reference component of the VOR signal.

Turning now to FIG. 5, there is illustrated in block diagram form the circuitry for extracting the zero degree reference component from the output of the NAV receiver. The circuit comprises a high pass filter 220 coupled to the output of NAV receiver 42 and designed to pass the 9,960 Hz frequency modulated subcarrier and its associated side bands. Filter 220 is connected to a product detector 222 which serves as an FM demodulator to extract the 30 Hz frequency modulation. The demodulator output is connected through a 30 Hz bandpass filter 224 and a squaring circuit 226 to generate a 30 Hz squarewave in phase with the 30 Hz subcarrier modulation. The squarewave output is coupled through a differentiator-clipper circuit 228 to convert the squarewave into a pulse train having a single pulse of desired polarity, as the zero degree reference signal for the system.

Figure 6:
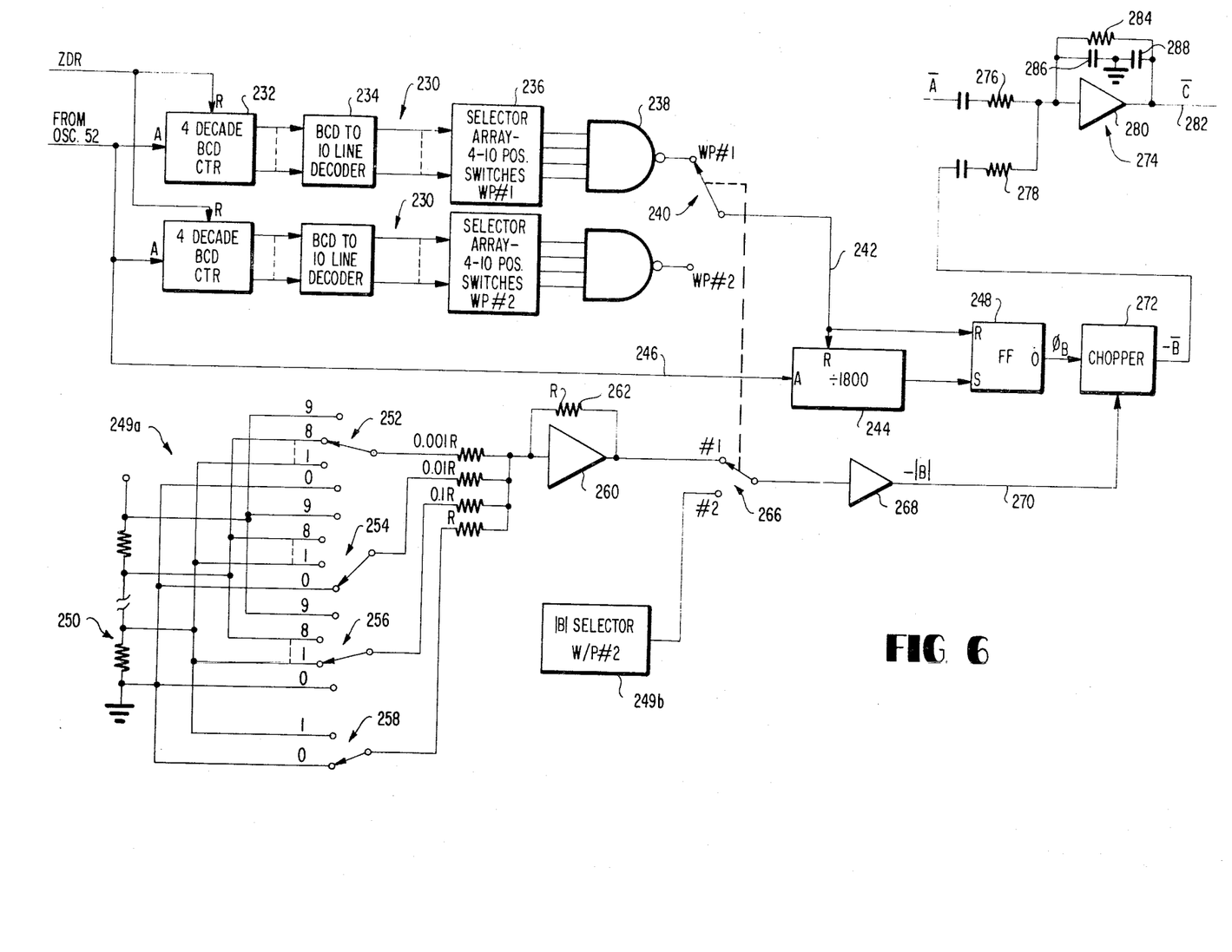
FIG. 6 is a detailed block diagram of the multiple waypoint address selection subsystem, and the circuitry for generating the VORTAC to waypoint and waypoint to aircraft vector.

Referring now to FIG. 6, there is illustrated the circuitry for generating two waypoint addresses, and for utilizing the waypoint addresses to generate the VOR-TAC to waypoint vector $\overline{B}$. The azimuth components of the waypoint addresses are generated by a pair of identical circuits 230 each comprising a four-decade BCD counter 232, a BCD to 10-line converter 234 having separate decoder sections associated with each decade of counter 232, and a selector array 236. The latter includes three ten-position switches, each having its fixed contacts connected to the ten outputs of one of the ten-line decoder stages for the three least significant decades of counter 232, and a four-position switch having its fixed contacts connected to the "0," "1," "2," and "3" outputs of the decoder for the most significant decade of counter 232. The moving contacts for all four switches are connected as inputs of a NAND gate 238. The advance input for counters 232 are provided by the output of oscillator 52, while a reset input is provided by the zero degree reference signal described above.

The output of one of NAND gates 238 is selected by a two-position switch 240 to provide a pulse over lead 242 a predetermined number of cycles of the output of oscillator 52 after each zero degree reference pulse. Since the 3 count of the most significant decade is the highest employed, a maximum count of 3,999 is possible, but the highest actual count will of course be 3,599, corresponding to an angle of 359.9°. The latter signal provides the reset input for an 1,800 count divide down counter 244, the advance input for which is provided over lead 246 by the output of master oscillator 52.

The output of divide down counter 244 is connected to the set input of a set-reset flip-flop 248, the reset input for which is provided over lead 242 by switch 240. Flip-flop 248 operates to provide a squarewave having a phase relationship $\phi_B$ determined by selector array 236. Circuit operation is as follows:

Since the ZDR signal is a sequence of pulses at 30 Hz, counters 232 are reset at the beginning of each zero degree reference cycle. The counters then advance at 108 kHz. When the counts determined by selector arrays 236 are reached, pulse outputs are provided by NAND gate 238.

The count pulse for the desired waypoint address as selected by switch 240 resets flip-flop 248 and counter 244, the ZERO output of the former going high. Counter 244 advances in response to the master pulse output of oscillator 52, and provides an output at a count of 1,800 to set flip-flop 248. At that time the ZERO output goes low and remains low until the flip-flop is again reset by the selected pulse output on lead 242.

Since the reset always occurs a predetermined number of counts representing the desired azimuth angle $\phi_B$ after the zero degree reference pulse, it may be seen that the output of flip-flop 248 is a squarewave delayed from the zero degree reference signal by a number of counts equal to the desired phase difference between the zero degree reference and the angle $\phi_B$ (measured in tenths of a degree.) The flip-flop output will be a perfect squarewave assuming that oscillator 152 is exactly on frequency, or may be non-symmetrical as in the case of the $\phi_A$ signal if the oscillator is not exactly on frequency. Again, however, all angles ae referenced to the oscillator output whereby any error is without significance in the computation.

The range components of the $\overline{B}$ vectors are generated by a pair of selectors 249(a) and (b), each including a precision potentiometer 250 comprised of nine equal precision resistors connected in series between ground and the negative power supply. Resistance chain 250 is tapped at the ground and power supply points, and at the intermediate junctions between resistors to provide nine negative voltage levels and ground. Each of the 10 tapping points is connected respectively to the fixed contacts of three 10-position selector switches 252, 254 and 256 respectively representing range values of 10ths, ones and tens of nautical miles. In addition, a further two-position switch 258 is connected to the ground position and the first tap on resistance chain 250 to provide for selection of zero or 100 nautical miles.

The moving contacts of each of switches 252–258 are connected through individual resistors to the summing junction of an operational amplifier 260 having a feedback resistor 262 to provide operation as an analog coefficient multiplier. To provide the required scaling, the resistor connected to switch 258 has a value R (as does feedback resistor 262) whereby the coefficient multiplication of the output of that switch is "1." Correspondingly, the contacts of the values of the resistors for switches 256, 254, and 252 are 0.1R, 0.01R, and 0.001R, respectively, thereby providing coefficient multiplications of 0.1, 0.01, and 0.001.

An identical selector unit, generally denoted 249 (b) provides for selection of the range component of the B vector for the second waypoint. The two signal levels are coupled to respective fixed contacts of a two-position switch 266 mechanically coupled to switch 240 to provide the range component for the desired waypoint. The selected signal is coupled by means of an inverter 268 to provide a signal over lead 270 representing minus the magnitude of the B vector, $-|B|$. This is coupled to the signal input of a chopper 272 which is driven by the $\phi_B$ output of flip-flop 248. Thus, the chopper output is a squarewave having an amplitude determined by the value of the signal on lead 270, and a phase relationship with respect to the zero degree reference determined by the switches comprising selector arrays 236. The vector $-\overline{B}$ is provided as one input to the $\overline{C}$ vector generator circuit 76 now to be described in detail.

In essence, generation of the $\overline{C}$ vector is accomplished by algebraic combination of the $\overline{A}$ and $-\overline{B}$ vectors, and conversion to a 30 Hz sine wave for further processing, using circuitry shown in FIG. 6. The circuit comprises a series RC input 276 for the vector $\overline{A}$, and a like series RC input 278 for the $-\overline{B}$ vector. Circuits 276 and 278 are coupled to the summing junction of an operational amplifier 280, the output of which, on lead 282, provides the $\overline{C}$ vector signal.

Amplifier 280 is provided with an RC feedback circuit comprising a resistor 284 in parallel with a pair of series connected capacitors 286 and 288, the junction of which is grounded. The values for resistor 284 and capacitors 286 and 288 are so chosen that amplifier 280 operates as an active filter tuned to 30 Hz. Thus, the squarewaves representing the vectors $\overline{A}$ and $-\overline{B}$ are added, and the fundamental component at 30 Hz extracted to produce the vector $\overline{C}$ as a sine wave having an amplitude equal to the range component of the $\overline{C}$ vector, and a phase in relation to the zero degree reference equal to $\phi_C$.

Referring back to FIG. 2, the vector $\overline{C}$ appearing on lead 78 is used to generate the DMW display (by means of magnitude generator 80 and display unit 82) and, in conjunction with digital track selector 84, to operate track deviation indicator 88, and "to-from" flag 102.

Figure 7:
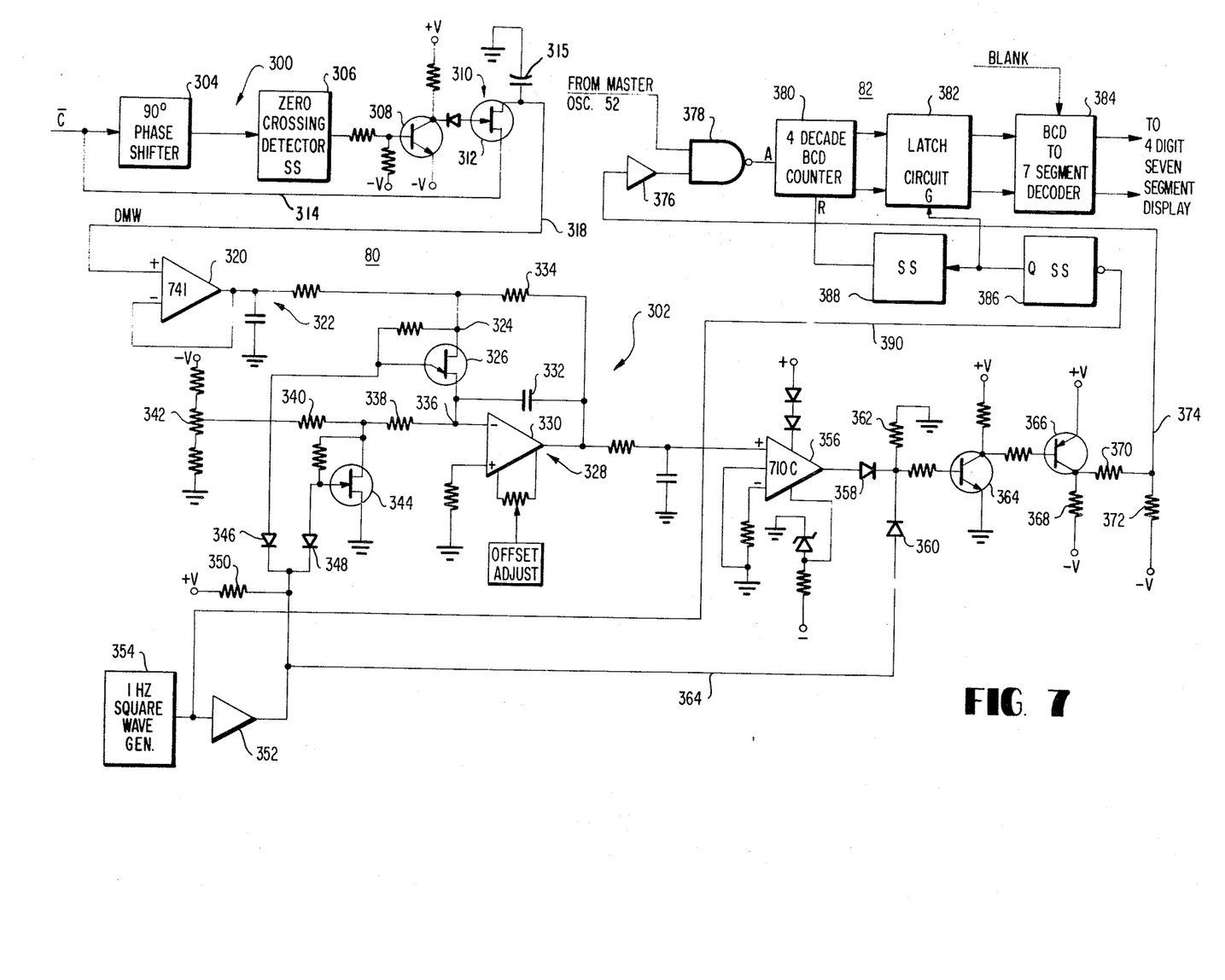
FIG. 7 is a detailed block diagram showing the equipment used for generating the magnitude of the waypoint to aircraft vector and the equipment for displaying the same in digital form.

The construction of magnitude generator 80 and DMW display unit 82 is shown in FIG. 7.

The circuitry used to generate the magnitude $|C|$ of the $\overline{C}$ vector is comprised of a peak sampling circuit 300 and an analog to digital converter 302. Peak sampling circuit 300 is comprised of a 90° phase shifter 304 operating a zero crossing detector circuit 306, such as a single shot having an active period of about 1 microsecond, which in turn operates a driver circuit 308 for a sample and hold circuit 310. Phase shifter 304 triggers zero crossing detector 306 whenever the level of the 90° phase-shifter $\overline{C}$ vector reaches zero. This produces a short pulse to turn off driver transistor 308. Since the $\overline{C}$ vector is a sinusoidal signal, it may be seen that transistor 308 turns off when the $\overline{C}$ vector signal reaches its maximum level.

Turning off transistor 308 in turn actuates a FET 312 comprising part of sample and hold circuit 310. With FET 312 conducting, the source to drain signal path couples the $\overline{C}$ vector signal appearing on lead 314 to a capacitor 315 whereby capacitor 315 charges to a level representative of the maximum amplitude of the $\overline{C}$ vector signal. When zero crossing detector 306 times out, transistor 308 again conducts, which returns gate of FET 312 to a low level, turning the FET off, and isolating on capacitor 315 the charge stored while the FET was conducting.

The aforementioned charge level represents the DMW signal, and is coupled over lead 318 to a voltage follower amplifier 320. This is fed through an RC coupling circuit 322 to the source terminal 324 of a FET 326 comprising part of A to D converters 302. Transistor 326 is actually part of an integrator circuit 328 also comprising an operational amplifier 330, a feedback capacitor 332 and a feedback resistor 334 which, together with FET 326, provides a shunt path across capacitor 332. As illustrated, FET 326 is coupled between RC coupling circuit 322, and the summing junction 336 of amplifier 330. Thus, with transistor 326 nonconductive, the DMW signal coupled through amplifier 320, as well as shunt resistor 334 are disconnected from the integrator circuit.

Summing junction 336 is also connected by means of a pair of series resistors 338 and 340 to a voltage divider 342 connected between ground and the negative power supply. The junction between resistors 338 and 340 is shunted to ground through the source to drain signal path of another FET 344. Thus, with the latter conducting, the signal provided by voltage divider 340 is shunted to ground producing a zero input to summing junction 336 through resistor 338.

Control for FET's 326 and 344 is provided by respective diodes 346 and 348 coupled to the positive power supply through a resistor 350 and also to the output of an inverter 352. The latter is driven by a 1 Hz squarewave generator 354 thereby establishing a one second operating cycle for A to D converter 302, as described more fully below.

The output of integrator 328 is RC coupled to one input of a differential comparator circuit 356 which may be a Fairchild Type μA–710C or equivalent. The negative input for comparator 356 is referenced to ground. Thus, whenever the RC coupled output of integrator 328 is positive, a positive output is provided by the comparator. The output of the comparator is coupled through a diode 358 which, in conjunction with a second diode 360 and a grounded resistor 362 operate as an OR gate. Diode 360 is coupled over lead 364 to the output of inverter 352 previously described, while the output of the OR gate, at the junction between diode 358 and 360 is resistance-coupled to the base of an NPN transistor 364. This, in turn, is coupled to drive the base of a PNP transistor 366. The collector of transistor 366 is connected to the negative power supply through a customary collector resistor 368 and is also shunted to the negative power supply through a voltage divider comprised of a pair of resistors 370 and 372. The junction between resistors 370 and 372 is connected over lead 374 and an inverter 376 as the input for the DMW display unit 382.

In operation, the value of the $\overline{DMW}$ signal on lead 318 is updated each cycle of the $\overline{C}$ vector while the A to D converter operates on a one second cycle. In particular, when the output of squarewave generator 354 is low, the high output of inverter 352 maintains FET's 326 and 344 conductive. This shunts the negative signal from potentiometer 342 to ground, and causes integrator 328 to operate with a resistive input provided by RC circuit 322, and a parallel RC feedback circuit provided by capacitor 332 and resistor 334.

With summing point 336 of amplifier 330 provided at the negative input, it may be seen that capacitor 332 charges exponentially to a negative level corresponding to the value of the DMW signal on lead 318.

At the same time, the high output of inverter 352 on lead 364 is coupled through diode 360 to turn on transistors 364 and 366. With the latter conducting, it may be seen that the junction between resistors 368 and 370 are connected to the positive power supply and thus the voltage on line 374 is determined by relative values of resistors 370 and 372. The former are preferably chosen to be larger than the latter whereby the signal on lead 374 is sufficiently high in relation to the negative power supply to represent a logical ONE input for inverter 376, the latter than operating to provide a logical ZERO output. This inhibits operation of a NAND gate 376 comprising part of display unit 82 hereinafter described.

The time constant associated with resistors 334 and 332 is so chosen that the voltage across capacitor 332 reaches the desired negative level in substantially less than one-half second, at which time the output of squarewave generator 354 goes high. This produces a low output for inverter 352 which clamps the gate terminals of FET's 326 and 344 at low levels, turning both transistors off. Feedback resistor 334, and the DMW signal are now isolated from the integrator, and the latter is simply provided with a resistive input (resistors 338 and 340) and capacitive feedback (capacitor 332).

Integrator 328 therefore operates linearly, and integrates upward from the negative level corresponding to the DMW signal at a rate determined by the setting of potentiometer 342. As the integrator operates, the positive input to differential comparator 356 rises toward zero. When the zero level is reached, the comparator provides a positive output which is coupled to diode 358.

At the same time, the low level appearing on lead 364 is coupled through diode 360 to turn off transistors 364 and 366 whereby the voltage of the junction between resistors 370 and 372 on lead 374 goes to the negative power supply level. This represents a logical ZERO for inverter 376 which in turn provides as an output, a logical ONE to actuate NAND gate 376.

The above described condition continues as the output of integrator 328 increases linearly toward the ZERO level. At that time, comparator 356 operates to produce a high output which is coupled through diode 358 thereby returning the base of transistor 364 to a high level, and causing transistor 364 and 366 to again conduct. This returns the signal on lead 374 to a logical ONE and the output of inverter 376 to a logical ZERO, again inhibiting NAND gate 376.

From the foregoing, it may be seen that the output of inverter 376 is high for an interval from the beginning of linear operation of integrator 328 until the integrator output reaches zero. Since the time required for this depends on the negative level of the integrator output at the beginning of the linear integrating period, it may be seen that the time required for the integrator output to reach zero is directly proportional to the DC value of the DMW signal. The active period for NAND gate 378 is therefore a measure of the amplitude of the DMW signal.

The above described time interval is converted into a digital representation by counting the number of master oscillator pulses (at 108 kHz) during the interval and is presented visually by display unit 82. This comprises NAND gate 378 mentioned above, a four-decade BCD counter 380, a latch circuit 382 comprising 16 stages each associated with one of the 16 outputs of BCD counter 380, and a BCD to seven-segment decoder unit 384, all operating in conventional fashion to drive a four-digit seven-segment illuminated display.

Actuation of latch circuit 382 and reset of BCD counter 380 are controlled by a pair of single shots 386 and 388. The former is triggered by the high to low transition of the output of squarewave generator 354 over lead 390 while the latter is triggered by the Q output of single shot 386. The Q output of single shot 386 also activates latch circuit 382 to store the count contained in BCD counter 380 while the output of single shot 388, after a sufficient delay period to complete storage in the latch circuit, resets counter 380 in preparation for the next counting interval. It may thus be seen, that for a counting cycle beginning with a negative to positive transition of the 1 Hz squarewave, counter 380 advances by a number of counts equal to the number of tenths of a volt contained in the DMW signal and maintains that count until the beginning of a next half-cycle of the 1 Hz squarewave at which time it is dumped into latch circuit 382 and the counter reset. This provides continuous updating of the digital display of the DMW level on a once per second basis.

Figure 8:
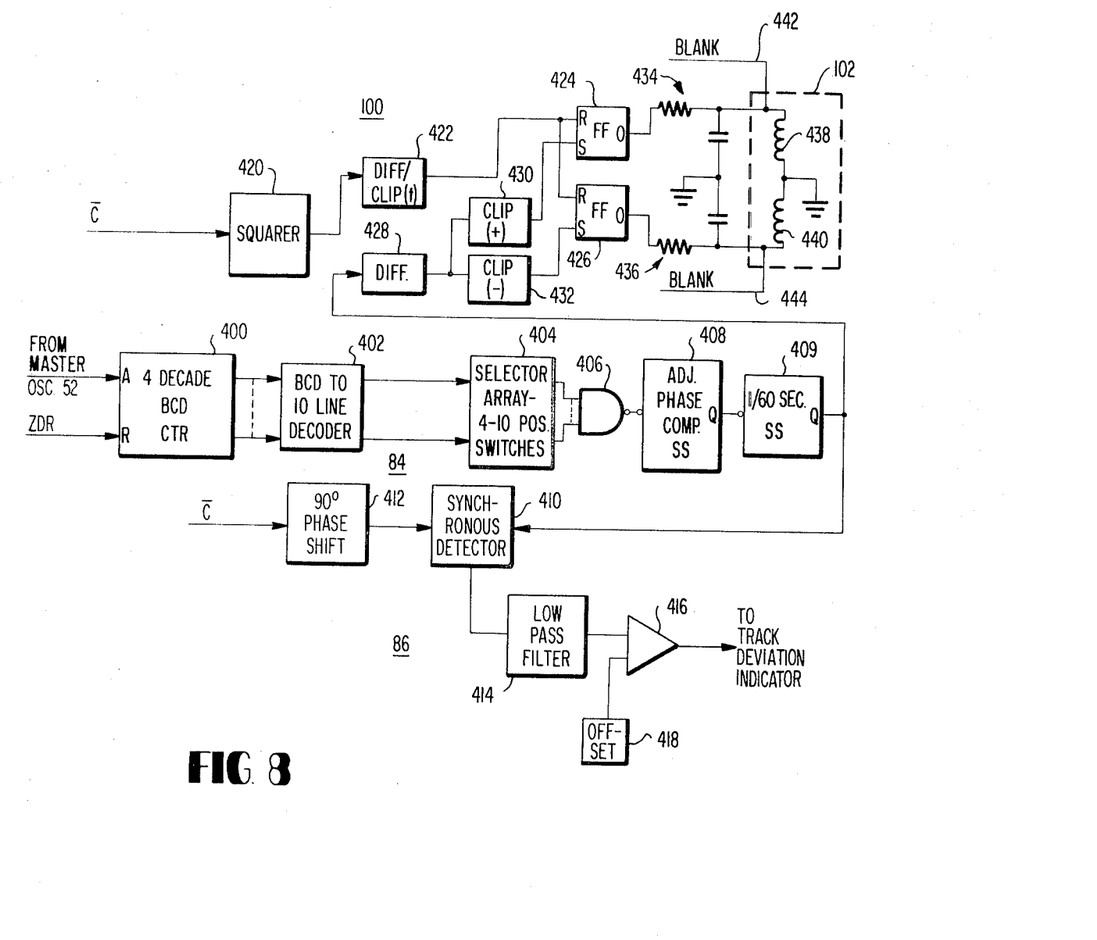
FIG. 8 is a detailed block diagram showing the construction of the track selection circuit, the "to-from" logic circuit, and the track deviation computer.

Turning now to FIG. 8, there is illustrated the construction of digital track selector unit 84, "to-from" computer 100 and the associated "to-from" display 102, and track deviation computer 86.

Digital track selector 84 is constructed in the same manner as azimuth angle synthesizers 62 and 64 described above, and includes a four-decade BCD counter 400 operated by master oscillator 52 and reset by the zero degree reference signal, and an associated BCD to 10-line decoder 402. A selector array 404 comprising three 10-position switches and a four-position switch allows selection of track angles up to 359.9°. A NAND gate 406 provides a pulse output when the desired number of oscillator counts after the zero degree reference has been reached.

The output of gate 406 is connected to a digital phase compensator circuit 408. This may be an adjustable single shot having a sufficient range of adjustability to allow delay of the track selection pulse by an amount equal to the net delay suffered by the $\overline{C}$ vector in relation to the ZDR signal.

The Q output of single shot 408 is connected to a negative trigger input of a second single shot 409 having a period equal to one-sixtieth of a second. The Q output is coupled to a synchronous detector circuit 410 comprising part of track deviation computer 86. The other input to synchronous detector 410 is the vector $\overline{C}$ generated as previously described, coupled through a suitable 90° phase shift circuit 412. The output of synchronous detector 410 is coupled through a low pass filter 414 as one input to a meter-driver amplifier 416. A second input is provided by an offset circuit 418 which may be a potentiometer, or the like, to provide a desired bias for meter-amplifier 416. The output of the meter-amplifier is connected to drive the standard "left-right" mechanism of the track deviation indicator meter.

Synchronous detector 410 is constructed in any suitable manner and produces as its output, a signal proportional to the magnitude of the $\overline{C}$ vector and the sine of the difference angle $\phi_D$ (see FIG. 1.) This signal is coupled through low pass filter 414 and meter-amplifier 416 to provide the track deviation measurement in nautical miles. Use of offset 418 permits convenient establishment of a track parallel to the selected track with the track deviation indicator needle centered rather than offset as would otherwise be necessary.

The selected track pulse produced by single shot 409 is also coupled as an input to the "to-from" computer 100. The latter is simply a digital phase detector circuit arranged to provide an output of one polarity if the phase difference between the selected track angle and the bearing angle corresponding to $\phi_C$ is less than plus or minus 90° and an output of opposite polarity if the difference is greater than plus or minus 90°. The circuit comprises an input squarer 420 receiving the $\overline{C}$ vector signal, a differentiator-clipper circuit 422 coupled to the output of squarer 420, a pair of flip-flops 424 and 426, a differentiator circuit 428 coupled to the output of single shot 409, and positive and negative clippers 430 and 432 connected to the output of differentiator 428. The reset inputs for flip-flops 424 and 426 are provided in common by the output of differentiator-clipper 422 while the set inputs for flip-flops 424 and 426 are respectively provided by the outputs of clippers 430 and 432. As indicated in FIG. 8, differentiator-clipper 422 is arranged to provide a pulse coincident with the low to high transition of the output of squarer 420, i.e., corresponding to the beginning of the positive half-cycle of the $\overline{C}$ vector. Differentiator 428 and clipper 430 operate similarly to provide a pulse corresponding to the low to high transition of the output of single shot 409, while differentiator 428 and clipper 432 provide an output corresponding to the high to low transition of the output of single shot 409.

The ZERO outputs of flip-flops 424 and 426 are coupled to respective RC circuits 434 and 436 which effectively integrate the flip-flop outputs and store charges on the respective capacitors indicating the duration of the "on" times of the flip-flops.

The capacitors are connected respectively across a pair of coils 438 and 440 which are part of solenoids for driving the "to-from" flag display.

Operation of the above described circuit is as follows:

Operation of squarer 420, and single shot 409 result in the appearance at the inputs of differentiators 422 and 428, of a pair of squarewaves having a phase difference representing the difference between the actual bearing of the aircraft to the waypoint, and the desired bearing. A computing cycle begins on a low to high transition of the squared $\overline{C}$ vector which resets both of flip-flops 424 and 426 causing a voltage buildup across the capacitors in RC circuits 434 and 436.

Depending on the phase relationship of the selected track angle and the angle $\phi_C$, reset of flip-flops 424 and 426 is followed by a positive or negative pulse to the input of clippers 430 and 432 corresponding to a low to high or high to low transition of the 90° shifted selected track angles. Assuming that a positive pulse indicates that the selected track angle is within ± 90° of the angle $\phi_C$, this will correspond to a "to" indication while appearance of a negative pulse first will correspond to an angular difference greater than plus or minus 90°, and representing a "from" indication.

In either case, whichever signal comes first will set the associated one of flip-flop 424 and 426 causing the associated capacitor to discharge while the voltage on the capacitor associated with the unset flip-flop continues to increase.

As illustrated, coils 438 and 440 are connected together and grounded; therefore, whichever RC circuit is at the highest, that circuit will operate the associated side of the "to-from" indicator flag thereby providing the desired "to-from" indication. For blanking purposes, both of coils 438 and 440 are shunted to ground by means of leads 442 and 444 thereby maintaining the flag in a neutral position.

In the foregoing, there has been described a novel and improved area navigation computer having improved operational features, accuracy, and compatibility with standard VOR and DME receivers. While a particular embodiment has been described, it should be understood that a variety of modifications are possible within the scope of the invention. For example, the circuits described may be subject to structural modification without change of the required function. Likewise, while the use of a digital phase synthesizer for the selected track angle is preferable in improving system accuracy, standard analog circuitry including a synchro-resolver unit, e.g., a complete standard course deviation indicator, may be substituted. Various other changes within the scope of the invention will also be apparent to one skilled in the art in light of the above description.

Accordingly, the invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. An area navigation computer for use with standard DME and VOR receivers comprising: DME coupler means for connection to a standard DME receiver to provide a signal analog of the aircraft to VORTAC range $|A|$; means for connection to a standard NAV receiver to provide the demodulated output thereof including a variable phase component representing the azimuth angle $\phi_A$ and a periodic fixed phase component independent of aircraft bearing to the VORTAC; first processing means responsive to said fixed phase component of the NAV receiver output to generate a repetitive zero degree reference; second processing means responsive to the variable phase component of said NAV receiver output to generate a squarewave having a leading edge of each cycle thereof in selective phase relationship with said variable phase component; third processing means coupled to said second processing means and to said DME coupler means for combining the $|A|$ and $\phi_A$ signals to generate a signal analog of vector $\overline{A}$ as a squarewave of amplitude $|A|$ and of phase $\phi_A$ in relation to the zero degree reference; a master clock; waypoint address selection means comprising a waypoint counter, means responsive to the output of said clock for advancing said waypoint counter, means responsive to the zero degree reference to reset said waypoint counter, means to generate a signal analog of a waypoint azimuth $\phi_B$, a portion of which coincides with said waypoint counter reaching a predetermined count corresponding to said azimuth $\phi_B$; means to generate a DC level corresponding to a waypoint range $|B|$, and fourth processing means to combine the $|R|$ and $\phi_B$ signals to generate a signal analog of vector $\overline{B}$ in the form of a squarewave of amplitude $|B|$, and phase $\phi_B$ in relation to the zero degree reference; fifth processing means to combine the $\overline{A}$ and $\overline{B}$ signals to generate a signal analog of the vector $\overline{C}$ having a magnitude $|C|$ and a phase $\phi_C$ in relation to the zero degree reference; means to establish a signal analog of the selected track angle having a phase $\phi_T$ in relation to said zero degree reference; and sixth processing means responsive to said selected track operational to $|C| \sin(\phi_T - \phi_C)$ as a measure of the linear deviation of the aircraft from the selected track, said means for generating said waypoint azimuth signal analog comprising means to generate a timing pulse when said waypoint counter reaches said predetermined count; bi-stable circuit means, means responsive to said pulse to set the bi-stable circuit means in one state; and interval timer; means responsive to said pulse to start said interval timer; and means connected to said interval timer to set said bi-stable circuit in the other of its states at the end of said interval, said interval being approximately one-half of the repetition period of said zero degree reference and said $\overline{A}$ signal analog whereby alternate switching of the states of said bi-stable circuit defines a rectangular waveform for said $\phi_B$ signal analog of approximately said repetition period.

2. An area navigation computer as defined in claim 1 wherein said interval timer comprises a second counter, means for advancing said second counter in response to the output of said master clock means responsive to said timing pulse for resetting said second counter simultaneously with the placement of said bi-stable circuit in said first state, and means responsive to a predetermined output state of said second counter for placing said bi-stable circuit in its second state, said predetermined output state corresponding to exactly one-half the repetition period of said zero degree reference for the selected operating frequency of said master clock.

3. An area navigation computer as defined in claim 2 wherein said second processing means comprises means for extracting a sinusoidal signal corresponding to the variable phase component of the NAV receiver output; means for converting said sinusoidal signal into a squarewave; a bi-stable circuit element, means for placing said bi-stable circuit element in a first state in response to the leading edge of said squarewave, an A-phase counter, means for resetting said A-phase counter in response to the leading edge of each cycle of said squarewave, means coupling the output of said master clock to advance said A-phase counter, and means responsive to a predetermined count state of said A-phase counter to place said bi-stable element in its second state, said predetermined count corresponding to exactly one-half the repetition period of said zero degree reference at the selected frequency of said master clock.

4. An area navigation computer for use with standard DME and VOR receivers comprising: DME coupler means for connection to a standard DME receiver to provide a signal analog of the aircraft to VORTAC range $|A|$; means for connection to a standard NAV receiver to provide the demodulated output thereof including a variable phase component representing the azimuth angle $\phi_A$ and a periodic fixed phase component independent of aircraft bearing to the VORTAC; first processing means responsive to said fixed phase component of the NAV receiver output to generate a repetitive zero degree reference; second processing means responsive to the variable phase component of said NAV receiver output to generate a squarewave having a leading edge of each cycle thereof in selective phase relationship with said variable phase component; third processing means coupled to said second processing means and to said DME coupler means for combining the $|A|$ and $\phi_A$ signals to generate a signal analog of vector $\overline{A}$ as a squarewave of amplitude $|A|$ and of phase $\phi_A$ in relation to the zero degree reference; a master clock; waypoint address selection means comprising a waypoint counter, means responsive to the output of said clock for advancing said waypoint counter, means responsive to the zero degree reference to reset said waypoint counter, means to generate a signal analog of a waypoint azimuth $\phi_B$, a portion of which coincides with said waypoint counter reaching a predetermined count corresponding to said azimuth $\phi_B$; means to generate a DC level corresponding to a waypoint range $|B|$, and fourth processing means to combine the $|B|$ and $\phi_B$ signals to generate a signal analog of vector $\overline{B}$ in the form of a squarewave of amplitude $|B|$, and phase $\phi_B$ in relation to the zero degree reference; fifth processing means to combine the $\overline{A}$ and $\overline{B}$ signals to generate a signal analog of the vector $\overline{C}$ having a magnitude $|C|$ and a phase $\phi_C$ in relation to the zero degree reference; means to establish a signal analog of the selected track angle having a phase $\phi_T$ in relation to said zero degree reference; and sixth processing means responsive to said selected track analog signal and said $\overline{C}$ analog signal to generate a signal proportional to $|C| \sin(\phi_T - \phi_C)$ as a measure of the linear deviation of the aircraft from the selected track, said means to generate said DC level corresponding to the waypoint address component comprising a precision adjustable voltage divider, said voltage divider comprising a resistance chain connected across a voltage source, a plurality of means for selectively tapping said resistance chain at desired positions, an operational amplifier having resistive feedback, scaling means connected to each tapping means, said scaling means comprising resistances connected to the summing point of said operational amplifier, the relationship between said feedback resistance and the scaling resistors being such that the outputs of the selective tapping means are scaled by successively decreasing powers of 10 and summed together to provide the aggregate DC voltage output.

5. An area navigation computer for use with standard DME and VOR receivers comprising: DME coupler means for connection to a standard DME receiver to provide a signal analog of the aircraft VORTAC range $|A|$; means for connection to a standard NAV receiver to provide the demodulated output thereof including a variable phase component representing the azimuth angle $\phi_A$ and a periodic fixed phase component independent of aircraft bearing to the VORTAC; first processing means responsive to said fixed phase component of the NAV receiver output to generate a repetitive zero degree reference; second processing means responsive to the variable phase component of said NAV receiver output to generate a squarewave having a leading edge of each cycle thereof in selective phase relationship with said variable phase component; third processing means coupled to said second processing means and to said DME coupler means for combining the $|A|$ and $\phi_A$ signals to generate a signal analog of vector $\overline{A}$ as a squarewave of amplitude $|A|$ and of phase $\phi_A$ in relation to the zero degree reference; a master clock; waypoint address selection means comprising a waypoint counter, means responsive to the output of said clock for advancing said waypoint counter, means responsive to the zero degree reference to reset said waypoint counter, means to generate a signal analog of a waypoint azimuth $\phi_B$, a portion of which coincides with said waypoint counter reaching a predetermined count corresponding to said azimuth $\phi_B$; means to generate a DC level corresponding to a waypoint range $|B|$, and fourth processing means to combine the $|B|$ and $\phi_B$ signals to generate a signal analog of vector $\overline{B}$ in the form of a squarewave of amplitude $|B|$, and phase $\phi_B$ in relation to the zero degree reference; fifth processing means to combine the $\overline{A}$ and $\overline{B}$ signals to generate a signal analog of the vector $\overline{C}$ having a magnitude $|C|$ and a phase $\phi_C$ in relation to the zero degree reference; means to establish a signal analog of the selected track angle having a phase $\phi_T$ in relation to said zero degree reference; and sixth processing means response to said selected track analog signal and said $\overline{C}$ analog signal to generate a signal proportional to $|C| \sin (\phi_T - \phi_C)$ as a measure of the linear deviation of the aircraft from the selected track, said waypoint address selection means further including a second waypoint counter, means for advancing said second waypoint counter in response to said master clock output, means for resetting said waypoint counter in response to said zero degree reference signal, and wherein said means for generating said waypoint azimuth signal analog comprises means associated with said first and second waypoint counters to generate pulses when the counts thereof reach predetermined counts corresponding to first and second selected values for a waypoint azimuth $\phi_B$; switching means for selecting the output of said first or said second pulse generating means; bi-stable circuit means, means connecting the output of said switching means to set the bi-stable circuit means in one state responsive to the selected pulse; an interval timer; means responsive to said selected pulse to start said interval timer; and means connected to said interval timer to set said bi-stable circuit in the other of its states at the end of said interval, said interval being approximately one-half of the repetition period of said zero degree reference and said A signal analog whereby alternate switching of the states of said bi-stable circuit defines a rectangular waveform for said $\phi_B$ signal analog of approximately said repetition period.

6. An area navigation computer as defined in claim 5 wherein said interval timer comprises a third counter, means for advancing said third counter in response to the output of said master clock, means responsive to said selected pulse for resetting said third counter simultaneously with the placement of said bi-stable circuit in said first state, and means responsive to a predetermined output state of said third counter for placing said bi-stable circuit in its second state, said predetermined count corresponding to exactly one-half the repetition period of said zero degree reference for the selected operating frequency of said master clock.

7. An area navigation computer as defined in claim 5 further including first and second precision voltage dividers comprising first and second means for generating range components of first and second waypoint addresses, and switching means for selectively coupling said first and second range components to said fourth processing means.

8. An area navigation computer for use with standard DME and VOR receivers comprising: DME coupler means for connection to a standard DME receiver to provide a signal analog of the aircraft to VORTAC range $|A|$; means for connection to a standard NAV receiver to provide the demodulated output thereof including a variable phase component representing the azimuth angle $\phi_A$ and a periodic fixed phase component independent of aircraft bearing to the VORTAC; first processing means responsive to said fixed phase component of the NAV receiver output to generate a repetitive zero degree reference; second processing means responsive to the variable phase component of said NAV receiver output to generate a squarewave having a leading edge of each cycle thereof in selective phase relationship with said variable phase component; third processing means coupled to said second processing means and to said DME coupler means for combining the $|A|$ and $\phi_A$ signals to generate a signal analog of vector $\overline{A}$ as a squarewave of amplitude $|A|$ and of phase $\phi_A$ in relation to the zero degree reference; a master clock; waypoint address selection means comprising a waypoint counter, means responsive to the output of said clock for advancing said waypoint counter, means responsive to the zero degree reference to reset said waypoint counter, means to generate a signal analog of a waypoint azimuth $\phi_B$, a portion of which coincides with said waypoint counter reaching a predetermined count corresponding to said azimuth $\phi_B$; means to generate a DC level corresponding to a waypoint range $|B|$, and fourth processing means to combine the $|B|$ and $\phi_B$ signals to generate a signal analog of vector $\overline{B}$ in the form of a squarewave of amplitude $|B|$, and phase $\phi_B$ in relation to the zero degree reference; fifth processing means to combine the $\overline{A}$ and $\overline{B}$ signals to generate a signal analog of the vector $\overline{C}$ having a magnitude $|C|$ and a phase $\phi_C$ in relation to the zero degree reference; means to establish a signal analog of the selected track angle having a phase $\phi_T$ in relation to said zero degree reference; and sixth processing means responsive to said selected track analog signal and said $\overline{C}$ analog signal to generate a signal proportional to $|C| \sin(\phi_T - \phi_C)$ as a measure of the linear deviation, of the aircraft from the selected track, said second processing means comprising means for extracting a sinusoidal signal corresponding to the variable phase component of the NAV receiver output; means for converting said sinusoidal signal into a squarewave; a bi-stable circuit element; means for placing said bi-stable circuit element in a first state in response to the leading edge of said squarewave; an A-phase counter, means to reset said A-phase counter in response to the leading edge of each cycle of said squarewave; means coupling the output of said master clock to advance said A-pulse counter for placing said bi-stable circuit element in its second state; said predetermined count corresponding to exactly one-half the repetition period of said zero degree reference for the selected frequency of said master clock.

9. An area navigation computer for use with standard DME and VOR receivers comprising: DME coupler means for connection to a standard DME receiver to provide a signal analog of the aircraft to VORTAC range $|A|$; means for connection to a standard NAV receiver to provide the demodulated output thereof including a variable phase component representing the azimuth angle $\phi_A$ and a periodic fixed phase component independent of aircraft bearing to the VORTAC; first processing means responsive to said fixed phase component of the NAV receiver output to generate a repetitive zero degree reference; second processing means responsive to the variable phase component of said NAV receiver output to generate a squarewave having a leading edge of each cycle thereof in selective phase relationship with said variable phase component; third processing means coupled to said second processing means and to said DME coupler means for combining the $|A|$ and $\phi_A$ signals to generate a signal analog of vector $\overline{A}$ as a squarewave of amplitude $|A|$ and of phase $\phi_A$ in relation to the zero degree reference; a master clock; waypoint address selection means comprising a waypoint counter, means responsive to the output of said clock for advancing said waypoint counter, means responsive to the zero degree reference to reset said waypoint counter, means to generate a signal analog of a waypoint azimuth $\phi_B$, a portion of which coincides with said waypoint counter reaching a predetermined count corresponding to said azimuth $\phi_B$; means to generate a DC level corresponding to a waypoint range $|B|$, and fourth processing means to combine the $|B|$ and $\phi_B$ signals to generate a signal analog of vector $\overline{B}$ in the form of a squarewave of amplitude $|B|$, and phase $\phi_B$ in relation to the zero degree reference, fifth processing means to combine the $\overline{A}$ and $\overline{B}$ signals to generate a signal analog of the vector $\overline{C}$ having a magnitude $|C|$ and a phase $\phi_C$ in relation to the zero degree reference; means to establish a signal analog of the selected track angle having a phase $\phi_T$ in relation to said zero degree reference; and sixth processing means responsive to said selected track analog signal and said $\overline{C}$ analog signal to generate a signal proportional to $|C| \sin(\phi_T - \phi_C)$ as a measure of the linear deviation of the aircraft from the selected track, said means for establishing said selected track angle analog comprising a track counter, means for resetting said track counter in response to said zero degree reference signal, means for advancing said track counter in response to the output of said master oscillator, means for generating a pulse when said track counter reaches a predetermined count corresponding to the selected track angle, and means responsive to said pulse for generating a squarewave having a period approximately equal to that of the zero degree reference and a phase relationship with said zero degree reference corresponding to said angle $\phi_T$.

10. An area navigation computer as defined in claim 9 wherein said means for generating said squarewave comprises an adjustable phase compensator and a single shot multivibrator having a period equal to half the desired squarewave period, said adjustable phase compensator being operative in response to said selected track angle pulse to trigger said single shot after a predetermined delay in accordance with the adjustment thereof.

11. An area navigation computer for use with standard DME and VOR receivers comprising: DME coupler means for connection to a standard DME receiver to provide a signal analog of the aircraft to VORTAC range $|A|$; means for connection to a standard NAV receiver to provide the demodulated output thereof including a variable phase component representing the azimuth $\phi_A$ and a periodic fixed phase component independent of aircraft bearing to the VORTAC; first processing means responsive to said fixed phase component of the NAV receiver output to generate repetitive zero degree reference; second processing means responsive to the variable phase component of said NAV receiver output to generate a squarewave having a leading edge of each cycle thereof in selective phase relationship with said variable phase component; third processing means coupled to said second processing means and to said DME coupler means for combining the $|A|$ and $\phi_A$ signals to generate a signal analog of vector $\overline{A}$ as a squarewave of amplitude $|A|$ and of phase $\phi_A$ in relation to the zero degree reference; a master clock; waypoint address selection means comprising a waypoint counter, means responsive to the output of said clock for advancing said waypoint counter, means responsive to the zero degree reference to reset said waypoint counter, means to generate a signal analog of a waypoint azimuth $\phi_B$, a portion of which coincides with said waypoint counter reaching a predetermined count corresponding to said azimuth $\phi_B$; means to generate a DC level corresponding to a waypoint range $|B|$, and fourth processing means to combine the $|B|$ and $\phi_B$ signals to generate a signal analog of vector $\overline{B}$ in the form of a squarewave of amplitude $|B|$, and phase $\phi_B$ in relation to the zero degree reference; fifth processing means to combine the $\overline{A}$ and $\overline{B}$ signals to generate a signal analog of the vector $\overline{C}$ having a magnitude $|C|$ and a phase $\phi_C$ in relation to the zero degree reference; means to establish a signal analog of the selected track angle having a phase $\phi_T$ in relation to said zero degree reference; and sixth processing means responsive to said selected track analog signal and said $\overline{C}$ analog signal to generate a signal proportional to $|C| \sin(\phi_T - \phi_C)$ as a measure of the linear deviation of the aircraft from the selected track, and further including means to generate a signal representative of the magnitude $|C|$ of said vector $\overline{C}$ comprising: means to generate a DC signal representative of the peak value of the $\overline{C}$ vector analog signal; means responsive to said DC signal level to generate a timing interval, the duration of which is proportional to said peak level; a C-magnitude counter; means to activate said C-magnitude counter at the beginning of said timing interval; means to sample the state of said C-magnitude counter at the end of said timing interval; means to provide a digital display of the sampled count; and means for resetting said C-magnitude counter after the counter thereof has been sampled.

12. An area navigation computer as defined in claim 11 wherein said means for generating said DC level representative of the peak of said $\overline{C}$ vector analog signal comprises: phase shift means for shifting said $\overline{C}$ analog signal by 90°, zero crossing detector means responsive to the output of said phase shifter, and a sample and hold circuit, said sample and hold circuit being activated when the output of said 90° phase shifter crosses zero to sample and store the value of the $\overline{C}$ analog signal.

13. An area navigation computer as defined in claim 11 wherein said means for establishing said timing interval comprises an integrator, switching means for switching said integrator between saturable and linear modes of operation, a constant voltage source; said switching means being operative in one state to establish said saturable mode of integrator operation, and to couple said $|C|$ signal to the integrator input, said switching means further being operable in another state to establish said linear mode of integrator operation, and for connecting said constant voltage source to the integrator input; and means to provide a control signal from the time said integrator begins to operate linearly, until its output reaches a predetermined level.

14. An area navigation computer as defined in claim 13 wherein said integrator comprises an operational amplifier, capacitive feedback means for said amplifier, first and second resistive inputs for said integrator, and a feedback resistor for said amplifier, wherein said switching means comprises a first switching element for resistively coupling the $|C|$ signal to the summing point of said operational amplifier, and for concurrently shunting said feedback resistor across said feedback capacitor; means for coupling said constant DC level to said second resistive input; second switching means for shunting said second resistive input to ground when activated, further including cycle control means to actuate said first and second switching elements simultaneously at the beginning of a control cycle, and to deactuate said switching elements a predetermined time later; and wherein said means to provide said control signal comprises level sensing means connected to the output of said integrator, and circuit means connected to the output of said level sensing means and the cycle control means to generate said interval signal when switching elements are deactivated, and to inhibit said interval signal when said predetermined integrator output signal level has been attained.

15. A multiple waypoint address selection means for an area navigation computer including a master clock and means for processing the fixed phase component of the output of a standard VOR receiver to provide a zero degree reference signal for the computer; said waypoint address selection means comprising: means for storing information representative of the azimuth components of a plurality of waypoint addresses; means for storing information representative of the range components of a plurality of waypoint addresses; means for selecting stored information defining the address for a particular waypoint; digital phase synthesizing means responsive to the azimuth component of the selected address to generate a repetitive signal having a phase relation to the zero degree reference corresponding to the selected azimuth angle; said digital phase synthesizing means comprising: counting means, means responsive to the output of said master clock for advancing said counting means, means responsive to the zero degree reference signal to reset said counting means, means to establish a predetermined count corresponding to the selected azimuth angle, and logic means responsive to said counting means reaching said predetermined count for generating said repetitive signal; means for providing a DC level corresponding to the selected waypoint range component; and means to combine said repetitive signal and said DC level to generate a signal analog of the waypoint address vector B for a selected waypoint in the form of a squarewave of amplitude $|B|$ and of phase $\phi_B$ in relation to the zero degree reference.

16. Waypoint address selection means as defined in claim 15 wherein said logic means comprises bi-stable circuit means, means to set said bi-stable circuit means in one state when said counting means reaches said predetermined count, an interval timer, means responsive to said counting means reaching said predetermined count to start said interval timer, and means connected to said interval timer to set said bi-stable circuit in the other of its states at the end of said interval, said interval being approximately one-half the repetition period of said zero degree reference signal whereby alternate switching of the states of said bi-stable circuit defines a rectangular waveform of approximately said repetition period.

17. Waypoint address selection means as defined in claim 16 wherein said interval timer comprises further counting means, means for advancing said further counting means in response to the output of said master clock, means responsive to said first counting means reaching said predetermined count for resetting said second counting means simultaneously with the placement of said bi-stable circuit in said first state, and means responsive to a predetermined output state of said further counting means for placing said bi-stable circuit in its second state, said predetermined output state corresponding to exactly one-half the repetition period of said zero degree reference for the selected operating frequency of said master clock.

* * * * *

UNITED STATES PATENT OFFICE
CERTIFICATE OF CORRECTION

Patent No. 3,750,942     Dated August 7, 1973

Inventor(s) Stephen F. Bean

It is certified that error appears in the above-identified patent and that said Letters Patent are hereby corrected as shown below:

Column 1, line 25, "espect" should read --respect--.

Column 4, line 45, "09" should be canceled.

Column 5, line 56, "09" should be canceled.

Column 10, line 3, "9" should be canceled.

Column 12, line 59, "ae" should read --are--.

Column 19, line 27, claim 1, " |R| " should read -- |B| --; line 36, claim 1, "operational" should read --analog signal and said $\overline{C}$ analog signal to generate a signal proportional--.

Column 21, line 53, claim 5, "furtherincluding" should read --further including--.

Column 23, line 26, claim 9, " A| " should read -- |A| --.

Signed and sealed this 7th day of January 1975.

(SEAL)
Attest:

McCOY M. GIBSON JR.
Attesting Officer

C. MARSHALL DANN
Commissioner of Patents